United States Patent

Wood

[11] Patent Number: 5,286,843
[45] Date of Patent: Feb. 15, 1994

[54] PROCESS FOR IMPROVING WATER-WHITENING RESISTANCE OF PRESSURE SENSITIVE ADHESIVES

[75] Inventor: Timothy G. Wood, Horsham, Pa.

[73] Assignee: Rohm and Haas Company, Philadelphia, Pa.

[21] Appl. No.: 888,563

[22] Filed: May 22, 1992

[51] Int. Cl.$^5$ ............................................. C08F 6/00
[52] U.S. Cl. .................................... 528/482; 528/489; 528/490; 523/310
[58] Field of Search ...................... 528/482, 489, 490; 523/310

[56] References Cited

U.S. PATENT DOCUMENTS 3,494,878 2/1970 Harren et al. ........................ 524/521
3,509,084 4/1970 Anspon et al. ....................... 528/482
3,577,375 5/1971 Clampitt .............................. 523/310

Primary Examiner—Paul R. Michl
Assistant Examiner—LaVonda DeWitt

[57] ABSTRACT

A process is disclosed for improving the water-whitening resistance of a pressure sensitive adhesive containing an aqueous latex emulsion and water-soluble ions by removing the water-soluble ions and adjusting the pH of the pressure sensitive adhesive formulation to at least about 6.0. The preferred method of removing the water-soluble ions is to contact either the aqueous latex emulsion, the formulated pressure sensitive adhesive containing the aqueous latex emulsion, or both with ion exchange resin. The product produced by the process is also disclosed.

4 Claims, No Drawings

PROCESS FOR IMPROVING WATER-WHITENING RESISTANCE OF PRESSURE SENSITIVE ADHESIVES

FIELD OF THE INVENTION

This invention is directed to a process for improving aqueous latex emulsion coatings, and more particularly to a process for improving the water-whitening resistance of pressure sensitive adhesives.

1. Background of the Invention

Pressure sensitive adhesives may be used with transparent backings, such as for example polyvinyl chloride, polyethylene, polypropylene, polyester and the like, to form transparent labels and decals. Large labels and decals are applied to the sides of trucks, store windows and the like. These surfaces are often squeegied clean prior to the application of the label or decal. This leaves a thin layer of water on the surface. The wet surface allows for the adjustment or positioning of the label or decal. In cases where the backings are transparent, this can result in the development of water-whitening or hazing in the pressure sensitive adhesive, which persists until the system is substantially dry. This drying period may be unacceptably long. For example, a large label, such as that applied to the side of a truck, may take several hours to dry after application of the label. Because the labels and decals are used in advertising and displays, this water-whitening, although only temporary and not detrimental to the pressure sensitive adhesive's ultimate performance, is not aesthetically acceptable.

Although not intending to be bound by theory, I believe that the water-whitening or hazing is caused by the diffusion of water across latex particle boundaries into the interstitial areas in the dried coating forming pockets of water. This gives rise to an osmotic pressure which acts to push the latex particles apart. When the pockets of water become large enough, they scatter visible causing the water-whitening or hazing.

Normally when the aqueous latex emulsion dries, the latex particles coalesce to form a film and the other components of the adhesive formulation which may be ionically-charged and water-soluble become trapped in the interstitial areas of the film. These materials, such as for example, dispersants, surfactants, coalescents, wetting agents, rheology modifiers, thickners, drying retarders, antifoaming agents, preservatives, heat stabilizers, ultraviolet light absorbers and the like, may attract water because they may be more hydrophilic than the emulsion particles and become the driving force for the migration of the water into the interstitial areas causing the water-whitening problem. Solvent-based adhesives do not experience this water-whitening problem, however they present safety, health and environmental concerns. By contacting the aqueous latex emulsion used in the adhesive formulation or the formulated adhesive with an ion exchange resin, I have found that water-soluble ions may be removed so that the water-whitening resistance or hazing of the pressure sensitive adhesive is improved.

2. Description of the Prior Art

U.S. Pat. No. 3,033,811 concerns pigmented thermosetting coating compositions which can be applied from aqueous media to the surfaces to be coated. It teaches the removal of water-soluble ionizable compounds present in the dispersion by dialysis, deionization with ion exchange resins or precipitation to increase the water-resistance of the final baked coating.

U.S. Pat. No. 3,494,878 teaches an ion exchange resin of anionic or cationic types or mixtures thereof which are incorporated in aqueous coating compositions the binder of which comprises a dispersed emulsion polymer. The clear or pigmented coating compositions resist staining when the coatings are applied over cedar, redwood, mahogany and rusty surfaces.

U.S. Pat. No. 3,509,084 teaches a basic aqueous dispersion containing metallic ions which is contacted with a strongly acidic ion exchange resin charged with ammonium ions to produce an aqueous dispersion substantially free of metallic ions.

U.S. Pat. No. 4,775,588 teaches a hydrophilic film-forming composition which comprises a resin paint comprising a resin binder and a paint vehicle with a solid ion exchange resin powder dispersed in the vehicle. The incorporation of the ion exchange resin powder into an undercoat treatment provides improved corrosion resistance.

U.S. Pat. No. 4,853,422 teaches a paint coating comprising a self-curing emulsion polymer having functional carboxyl groups or hydroxyl group as well as alkylol acrylamide where said self-curing emulsion polymer is ion-exchanged to remove cations therefrom and the pH is less than 2.5.

U.S. Pat. No. 4,900,592 teaches a paint coating containing a thermosetting polymeric binder based on an ion-exchange treated, thermosetting functional latex polymer. The functional latex polymer comprises emulsion polymerized ethylenic monomers including a β-hydroxy ester monomer, but specifically excluding amine monomers, to produce a functional latex. The functional latex is then treated in an ion-exchange process to produce a low pH functional latex adapted to self-crosslink by transesterification with respective β-hydroxy ester groups in the latex.

It is an object of the invention to provide a process for improving the water-whitening resistance of pressure sensitive adhesives by removing the water-soluble ions from the latex polymer emulsion or pressure sensitive adhesive formulation containing latex polymer emulsion without adversely affecting the pressure sensitive adhesives performance properties.

It is a further object of the present invention to provide a pressure sensitive adhesive with improved water-whitening resistance.

Other objects and advantages will become apparent from the following description and claims.

SUMMARY OF THE INVENTION

This invention is a process for improving the water-whitening resistance of a pressure sensitive adhesive containing an aqueous latex emulsion by removing the water-soluble ions either from the aqueous latex emulsion or the formulated pressure sensitive adhesive containing the aqueous latex emulsion and adjusting the pH of the pressure sensitive adhesive formulation to at least about 6.0. It is preferred that the water-soluble ions are removed by contacting the aqueous latex emulsion the formulated pressure sensitive adhesive or both with ion exchange resins. The product of this process is a pressure sensitive adhesive with improved water-whitening resistance. The process is particularly useful for producing a pressure sensitive adhesive which is used to adhere clear labels and decals to surfaces, such as store windows and the sides of vehicles. The process solves the water-whitening problem typically encountered by the use of water on the surface to aid in the positioning of the clear label or decal. The process improves the aesthetic characteristics of the pressure sensitive adhesive without having a detrimental effect on the functional characteristics.

DETAILED DESCRIPTION OF THE INVENTION

The term "adhesive" as used herein refers to a coating containing an aqueous latex polymer which when applied to surfaces joins them together and resists separation.

The term "pressure sensitive" as used herein refers to adhesives which typically do not undergo hardening after they have been applied to surfaces and the joint formed.

The term "latex" as used herein refers to a water-insoluble polymer which may be prepared by conventional polymerization techniques such as, for example, by emulsion polymerization.

The aqueous latex polymers used in the pressure sensitive adhesives of this invention are prepared by emulsion polymerization techniques well known in the art. The aqueous latex polymer may be formed from any monomer or mixture of monomers which yields a water-insoluble latex, film-forming polymer. The aqueous latex polymers used in the pressure sensitive adhesives of this invention typically have a glass transition temperature as measured via differential scanning calorimetry of less than about $-10°$ C. The weight-average molecular weight of the aqueous latex polymer may be adjusted through the addition of n-dodecyl mercaptan during emulsion polymerization to give a suitable balance of adhesive and cohesive strength.

A wide variety of monomers or mixture of monomers may be used to make the aqueous latex polymer used in the adhesives of this invention. For example, acrylic ester monomers, including methyl acrylate, ethyl acrylate, propyl acrylate, isopropyl acrylate, butyl acrylate, isobutyl acrylate, secondary butyl acrylate, t-butyl acrylate, pentyl acrylate, neopentyl acrylate, hexyl acrylate, heptyl acrylate, octyl acrylate, isooctyl acrylate, 2-ethylhexyl acrylate, decyl acrylate, isodecyl acrylate, lauryl acrylate, bornyl acrylate, isobornyl acrylate, myristyl acrylate, pentadecyl acrylate, stearyl acrylate and the like; methacrylic acid ester monomers, including methyl methacrylate, ethyl methacrylate, propyl methacrylate, isopropyl methacrylate, butyl methacrylate, isobutyl methacrylate, hexyl methacrylate, octyl methacrylate, isooctyl methacrylate, decyl methacrylate, isodecyl methacrylate, lauryl methacrylate, bornyl methacrylate, isobornyl methacrylate, myristyl methacrylate, pentadecyl methacrylate, stearyl methacrylate, phosphoethyl methacrylate and the like; acrylic acid, methacrylic acid, itaconic acid, maleic acid, fumaric acid, styrene, substituted styrenes, butadiene, acrylonitrile, ethylene, vinyl acetate, vinyl chloride, sodium styrene sulfonates, sodium vinyl sulfonate, acrylamide, methacrylamide and the like may be used.

The removal of water-soluble ions from the aqueous latex polymer emulsion or pressure sensitive adhesive formulation is critical to the operation of this invention. The water-soluble ions may be removed by a number of techniques, including, but not limited to, centrifugation, dialysis, precipitation and deionization with ion exchange resins. The preferred method of removing the water-soluble ions is to contact the aqueous latex polymer emulsion or the formulated pressure sensitive adhesive containing the aqueous latex polymer emulsion with ion exchange resin. Contacting the final pressure sensitive adhesive formulation containing the aqueous latex polymer with the ion exchange resin is preferred.

The aqueous latex polymer emulsion or the pressure sensitive adhesive formulation containing the aqueous latex polymer may be treated with ion exchange resin either (1) by adding the ion exchange resin to the aqueous latex polymer emulsion or the pressure sensitive adhesive formulation containing the aqueous latex polymer; or (2) by passing the aqueous latex polymer emulsion or the pressure sensitive adhesive formulation containing the aqueous latex polymer over a column bed of ion exchange resin.

When adding the ion exchange resin to the aqueous latex polymer emulsion or the pressure sensitive adhesive formulation containing the aqueous latex polymer, the ion exchange resin must be mixed thoroughly to permit contact of the ion exchange resin surfaces with the water-soluble ions in the emulsion or adhesive. The contact can be effected by adding to the aqueous latex polymer emulsion or the pressure sensitive adhesive formulation containing the aqueous latex polymer from about 1%, by weight to about 100%, preferably greater than about 2%, by weight of the ion exchange resin to the weight of the emulsion or adhesive. The admixture may be agitated to facilitate contact between the ion exchange resin and the water-soluble ions. The ion exchange resin may be removed from the mixture by straining through a filter medium such as linen cloth, nylon mesh filter and the like to remove all of the ion exchange resin. The procedure may be repeated several times, if necessary, to remove the water-insoluble ions from the aqueous latex polymer emulsion or the pressure sensitive adhesive formulation containing the aqueous latex polymer.

The rate of from about 0.5 bed volume/hour to about 10 bed volumes/hour, of passing the aqueous latex polymer emulsion or the pressure sensitive adhesive formulation containing the aqueous latex polymer over a column bed of ion exchange resin is effective to remove the water-soluble ions. A rate of from about 1 bed volume/hour to about 6 bed volumes/hour is preferred, with a rate of from about 1 bed volume/hour to about 3 bed volumes/hour most preferred.

The preferred method of using the ion exchange resins comprises making a mixture of a sulfonic acid type cation exchanger in the acid form (to remove anions) and a quaternary anion exchange resin in the free base form (to remove cations), and contacting the aqueous latex polymer emulsion or the pressure sensitive adhesive containing the aqueous latex polymer to be deionized with the mixture. Such mixtures of cation and anion exchange resins are well-known to those skilled in the art as "mixed beds." Cation and anion exchange resins may also be used in succession. Cation or anion exchange resins may also be used separately, however complete deionization may not be achieved.

Suitable anion exchange resins useful alone, in succession, or in mixed beds include copolymers of styrene and divinyl benzene containing amine or quaternized amine functional groups and the like. Preferred are those resins in spherical bead form, including gel and macroporous beads. Examples of anion exchange resins are disclosed in U.S. Pat. Nos. 2,591,573; 2,591,574;

2,597,439; 2,597,440; 2,630,427; 2,630,428, 2,630,429; and 2,402,384 which are hereby incorporated herein by reference.

Suitable cation exchange resins useful alone, in succession, or in mixed beds include copolymers of styrene and divinyl benzene containing having strong acid functional groups such as sulfonic acid groups. Preferred are those resins in spherical bead form, including gel and macroporous beads. Examples of cation exchange resins are disclosed in U.S. Pat. Nos. 4,224,415; 4,256,840; and 4,382,124 which are hereby incorporated herein by reference.

More preferred for mixed bed use are anion exchange resins and cation exchange resins having different hydraulic densities, such that the two types of resins in the mixed bed will separate during reversed liquid flow through the bed, to allow easy regeneration of the two resins.

The pH of the pressure sensitive adhesive formulation containing the aqueous latex polymer emulsion after it has been deionized affects the operation of this invention. The pressure sensitive adhesive formulation containing the aqueous latex polymer must have a pH of greater than about 6, with higher pH's preferred. In practice, the pH is limited only to an upper level which does not thicken the pressure sensitive adhesive formulation containing the aqueous latex polymer above a viscosity useful in conventional coating techniques. Films cast from deionized pressure sensitive adhesive formulations having pH's less than about 6 exhibit poor water-whitening resistance. To adjust the pH of the pressure sensitive adhesive formulation, non-permanent bases, such as for example ammonium hydroxide, and the like may be added. Permanent bases, such as for example sodium hydroxide, typically are not suitable to adjust the pH because they add permanent ions which are detrimental on water whitening resistance.

The aqueous latex polymer emulsion may have a level of solids from about 40% to about 70%.

The pressure sensitive adhesive may be applied to substrates via conventional coating techniques including gravure, roller and slot-die coaters and the like.

The following examples are intended to illustrate the invention; they are not intended to limit the invention as other applications of the invention will be obvious to those of ordinary skill in the art.

| ABBREVIATIONS: | |
| --- | --- |
| g | grams |
| BA | butyl acrylate |
| EA | ethyl acrylate |
| AA | acrylic acid |

EXAMPLE 1

Preparation of Pressure Sensitive Adhesive Formulations

To a 1 pint can equipped with a laboratory stirrer, 100 g latex polymer emulsion was added:

| Pressure Sensitive Adhesive Formulation | Composition of Latex Polymer |
| --- | --- |
| 1 | 49 BA/49 EA/2 AA |
| Comparative 1 | 49 BA/49 EA/2 AA |
| 2 | 59 BA/39 EA/2 AA |
| Comparative 2 | 59 BA/39 EA/2 AA |
| 3 | 75 BA/22 EA/3 AA |

| Pressure Sensitive Adhesive Formulation | Composition of Latex Polymer |
| --- | --- |
| Comparative 3 | 75 BA/22 EA/3 AA |

At moderate agitation, 0.012 g Triton® X-45 surfactant, 0.3 g Emcol® 4500 surfactant and 0.6 g Drew® T-4201 defoamer were added and mixed. The pressure sensitive adhesive formulation was mixed for an additional 15 minutes. The pH of the final pressure sensitive adhesive formulation was adjusted to a range of 6.5 to 7.0 using 28% by weight solution of ammonium hydroxide.

EXAMPLE 3

Deionization of Pressure Sensitive Adhesive Formulations

Amberlite® IRN-150 ion exchange resin, a highly purified mixture of strongly acidic cation resin and strongly basic anion exchange resin with the mixture containing an equivalent of hydrogen ion for each equivalent of hydroxide ion, was added gradually to the pressure sensitive adhesive formulation and stirred to avoid the formation of large clumps. The mixture was stirred for about 2 hours and then filtered through a 325 mesh screen. The procedure was repeated, where necessary. The pressure sensitive adhesive formulations which were not deionized are designated as comparatives.

EXAMPLE 4

Preparation of Test Specimens

The pressure sensitive adhesive formulations were direct-coated onto Mylar® film using a Bird applicator and dried at 180° F. for 15 minutes to give a 1 mil dry film thickness. The test specimens were then nipped to untreated polypropylene. The test specimens were cut into the following sizes:

| Test | Dimensions |
| --- | --- |
| 180° peel adhesion | 1 inch wide strips |
| Polyken tack | 1 inch wide strips |
| Shear resistance testing | 1 inch wide strips |
| Water-whitening resistance | 1 inch by 5 inch strips |

The test specimens were conditioned at 77° F. and 55% relative humidity overnight prior to all testing.

EXAMPLE 5

Water-whitening Resistance Testing

To evaluate water-whitening resistance, the test specimens prepared according to Example 4 were placed a 4 ounce glass jar filled with tap water equilibrated to room temperature. The degree of opacity was visually rated at 5 minute intervals for a total of 90 minutes, using the following rating system:

| Rating | Description |
| --- | --- |
| 5 | completely transparent |
| 4 | slight whitening |
| 3 | moderate whitening |
| 2 | severe whitening |
| 1 | opaque |

The results are shown in Tables 5.1.

TABLE 5.1

| | Water-whitening Resistance Pressure Sensitive Adhesive Formulation | |
|---|---|---|
| Time (minutes) | Comparative 2* | 2* |
| 1 | 5 | 5 |
| 6 | 5 | 5 |
| 11 | 4 | 5 |
| 16 | 4 | 5 |
| 21 | 4 | 5 |
| 26 | 3 | 4 |
| 31 | 3 | 4 |
| 130 | 2 | 3 |
| 240 | 1 | 2 |

*Note:
Formulated with 1.5 parts per hundred parts latex polymer of a mixture of 10 parts by weight of 59 BA/39 EA/2 AA; 0.1 part by weight Triton ® X-45 surfactant; 0.3 part by weight Emcol ® 4500 surfactant; and 5 parts by weight Drew ® T-4201 defoamer

EXAMPLE 6

Effect of Deionization Sequence

The effect of deionization before and after formulation of the pressure sensitive adhesive was evaluated. the results are shown in Table 6.1. Deionization after formulation shows better water-whitening resistance than deionization before formulation.

TABLE 6.1

| | Water-whitening Resistance Pressure Sensitive Adhesive Formulation 2* | |
|---|---|---|
| Time (minutes) | Deionization before formulation | Deionization after formulation |
| 1 | 5 | 5 |
| 6 | 5 | 5 |
| 11 | 5 | 5 |
| 16 | 5 | 5 |
| 21 | 4 | 5 |
| 26 | 4 | 5 |
| 31 | 4 | 5 |
| 130 | 3 | 4 |
| 240 | 2 | 2 |

*Note:
Formulated with 1.5 parts per hundred parts latex polymer of a mixture of 10 parts by weight of 59 BA/39 EA/2 AA; 0.1 part by weight Triton ® X-45 surfactant; 0.3 part by weight Emcol ® 4500 surfactant; and 5 parts by weight Drew ® T-4201 defoamer

EXAMPLE 7

Effect of Ion Exchange Resin Weight and Repeated Treatment

The effect of ion exchange resin weight and repeated treatment were evaluated. The results are shown in Table 7.1. The results show that contacting from about 1% by weight to about 100%, preferably greater than about 2%, by weight of the ion exchange resin based on the weight of the pressure sensitive adhesive formulation is effective to improve the water-whitening resistance. When the procedure was repeated at the 2% by weight level an improvement in the water whitening resistance was also seen.

TABLE 7.1

| | Water-whitening Resistance Pressure Sensitive Adhesive Formulation 2* | | | | | |
|---|---|---|---|---|---|---|
| | Weight % Ion Exchange Resin | | | | | |
| | 30 | 20 | 10 | 2 | 2 | 0 |
| Time (minutes) | How many times? | | | | | |
| | 2 | 2 | 2 | 2 | 1 | 0 |
| 1 | 5 | 5 | 5 | 5 | 5 | 5 |
| 6 | 5 | 5 | 5 | 5 | 5 | 5 |
| 11 | 5 | 5 | 5 | 5 | 5 | 5 |
| 16 | 5 | 5 | 5 | 5 | 5 | 5 |
| 21 | 5 | 5 | 5 | 5 | 5 | 4 |
| 26 | 5 | 5 | 5 | 5 | 5 | 4 |
| 31 | 5 | 5 | 5 | 5 | 4 | 3 |
| 36 | 5 | 5 | 5 | 5 | 4 | 3 |
| 90 | 5 | 5 | 5 | 4 | 4 | 3 |
| 210 | 4 | 5 | 4 | 3 | 3 | 2 |
| 360 | 3 | 4 | 2 | 2 | 2 | 1 |

*Note:
Formulated with 1.5 parts per hundred parts latex polymer of a mixture of 10 parts by weight of 59 BA/39 EA/2 AA; 0.1 part by weight Triton ® X-45 surfactant; 0.3 part by weight Emcol ® 4500 surfactant; and 5 parts by weight Drew ® T-4201 defoamer

EXAMPLE 8

Effect of pH on Water-Whitening Resistance

The effect of pH of the final formulated pressure sensitive adhesive on the water-whitening resistance was evaluated. The results are shown in Table 8.1. The pressure sensitive adhesive formulation which had been deionized but which had not been readjusted to a pH greater than about 6.0 did not demonstrate an improved resistance to water-whitening.

TABLE 8.1

| | Water-whitening Resistance Pressure Sensitive Adhesive Formulation | | |
|---|---|---|---|
| Time (minutes) | Comparative 3 not deionized pH = 6.7 | 3 deionized pH = 1.75 | 3 deionized pH = 6.5 |
| 1 | 5 | 4 | 5 |
| 3 | 5 | 3 | 5 |
| 5 | 4 | 3 | 5 |
| 10 | 4 | 3 | 5 |
| 15 | 4 | 2 | 4 |
| 20 | 4 | 2 | 4 |
| 30 | 3 | 2 | 4 |
| 35 | 3 | 2 | 4 |
| 95 | 3 | 1 | 4 |

EXAMPLE 9

Pressure Sensitive Adhesive Property Performance Testing

The following tests were performed to demonstrate that deionization does not adversely affect the pressure sensitive adhesive performance properties of formulations. The results for the pressure sensitive adhesive property testing are shown in Table 9.1.

180° Peel Adhesion Test

The 180° peel adhesion test was performed according to Pressure Sensitive Tape Council Method Number 1 using dwell times of 20 minutes and 72 hours.

Polyken Tack Test

The Polyken tack test was performed using a Polyken Tack Tester from Testing Machines, Inc. with a 1 second dwell time, 1 centimeter/second probe withdrawal speed and a 20 gram weight.

Shear Resistance Test

The shear resistance test was performed according to Pressure Sensitive Tape Council Method Number 7, using a 1 inch by 1 inch overlap area and 1 kilogram weight.

TABLE 9.1

| | 180° Peel Adhesion (ounces/inch) | |
|---|---|---|
| | 20 minute dwell | 72 hour dwell |
| 1 | 54 | 73 |
| | adhesive failure mode | adhesive failure mode |
| Comparative 1 | 58 | 71 |
| | adhesive failure mode | adhesive failure mode |
| | Polyken Tack (grams) | |
| 1 | 715 | |
| Comparative 1 | 655 | |
| | Shear Resistance | |
| 1 | 86 light cohesive failure mode | |
| Comparative 1 | 99 cohesive failure mode | |

The results showed that deionization to improve water-whitening did not adversely affect the pressure sensitive adhesive formulations performance properties. In the 180° Peel Adhesion Test, the deionized formulation showed essentially the same peel strength values and the same type of failure mode as the comparative formulation which had not been deionized. In the Polyken Tack Test, the deionized formulation showed only a slight increase in the level of tack as compared to the comparative formulation which had not been deionized. In the Shear Resistance Test, the deionized formulation showed essentially the same shear strength value and type of failure mode as the comparative formulation which had not been deionized.

What is claimed is:

1. A process for improving the water-whitening resistance of a pressure sensitive adhesive containing an aqueous latex emulsion, where the pressure sensitive adhesive or the aqueous latex emulsion contain water-soluble ions, comprising:
   (a) removing the water-soluble ions; and
   (b) adjusting the pH of the pressure sensitive adhesive formulation to at least about 6.0.

2. The process of claim 1 where the water-soluble ions are removed by contacting the aqueous latex emulsion or the pressure sensitive adhesive with ion exchange resin.

3. The process of claim 2 where the ion exchange resin is a mixture of a sulfonic acid type cation exchanger in the acid form and a quaternary anion exchange resin in the free base form.

4. The process of claim 2 where the pH is adjusted using a nonpermanent base.

* * * * *